United States Patent
Oh et al.

(10) Patent No.: US 9,531,933 B2
(45) Date of Patent: Dec. 27, 2016

(54) CAMERA MODULE

(71) Applicant: LG INNOTEK CO., LTD., Seoul (KR)

(72) Inventors: Hyun Ah Oh, Seoul (KR); Youn Baek Jeong, Seoul (KR); Se Jin Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/930,300

(22) Filed: Nov. 2, 2015

(65) Prior Publication Data
US 2016/0057327 A1    Feb. 25, 2016

Related U.S. Application Data

(63) Continuation of application No. 13/683,091, filed on Nov. 21, 2012, now Pat. No. 9,197,796.

(30) Foreign Application Priority Data

Nov. 23, 2011  (KR) .......... 10-2011-0123090
Nov. 29, 2011  (KR) .......... 10-2011-0125610
Nov. 29, 2011  (KR) .......... 10-2011-0125612

(51) Int. Cl.
*H04N 5/225* (2006.01)
*G02B 5/20* (2006.01)
*G02B 7/02* (2006.01)
*G02B 7/09* (2006.01)
*G02B 27/00* (2006.01)
*H04N 5/232* (2006.01)

(52) U.S. Cl.
CPC ............ *H04N 5/2257* (2013.01); *G02B 5/208* (2013.01); *G02B 7/025* (2013.01); *G02B 7/09* (2013.01); *G02B 27/0006* (2013.01); *H04N 5/2253* (2013.01); *H04N 5/23241* (2013.01); *H04N 2201/03191* (2013.01)

(58) Field of Classification Search
None
See application file for complete search history.

(56) References Cited

U.S. PATENT DOCUMENTS

| 5,150,180 | A |   | 9/1992  | Yama |
| 5,383,034 | A | * | 1/1995  | Imamura ............... H04N 1/0312 250/208.1 |
| 6,075,237 | A |   | 6/2000  | Ciccarelli |
| 6,774,447 | B2 | * | 8/2004 | Kondo .............. H01L 27/14618 257/291 |
| 6,825,540 | B2 |   | 11/2004 | Harazono et al. |
| 6,898,030 | B1 |   | 5/2005  | Lin et al. |
| 7,379,113 | B2 |   | 5/2008  | Kong et al. |
| 7,423,334 | B2 |   | 9/2008  | Tu et al. |

(Continued)

FOREIGN PATENT DOCUMENTS

JP      2009-86139 A     4/2009
KR   10-2011-0022279 A   3/2011

*Primary Examiner* — Michael Osinski
(74) *Attorney, Agent, or Firm* — Birch, Stewart, Kolasch & Birch, LLP

(57) ABSTRACT

Exemplary embodiments of a camera module are proposed, the camera module including a PCB (Printed Circuit Board) mounted with an image sensor, a base installed at an upper surface of the PCB and formed with a window at a position corresponding to that of the image sensor, an IRCF (Infrared Cut Filter) installed at an upper surface of the base, and an adhesive member fixing the IRCF to the base.

10 Claims, 8 Drawing Sheets

(56) References Cited

U.S. PATENT DOCUMENTS

| | | |
|---|---|---|
| 7,515,202 B2 | 4/2009 | Saito et al. |
| 7,534,059 B2 | 5/2009 | Nishizaawa |
| 7,567,754 B2 * | 7/2009 | Kinoshita ................ G02B 7/08 348/345 |
| 7,570,297 B2 | 8/2009 | Maeda et al. |
| 7,663,686 B2 | 2/2010 | Chen |
| 7,755,694 B2 | 7/2010 | Tseng |
| 8,836,845 B2 | 9/2014 | Kagaya et al. |
| 9,338,337 B2 * | 5/2016 | Lee ........................ G03B 17/08 |
| 9,392,147 B2 * | 7/2016 | Lee ........................ G03B 17/02 |
| 2001/0007475 A1 | 7/2001 | Mogamiya |
| 2001/0020738 A1 | 9/2001 | Iizima et al. |
| 2001/0050717 A1 | 12/2001 | Yamada et al. |
| 2002/0012062 A1 | 1/2002 | Fushimi et al. |
| 2002/0119658 A1 | 8/2002 | Honda et al. |
| 2003/0094665 A1 | 5/2003 | Harazono |
| 2004/0041247 A1 * | 3/2004 | Kinsman ........... H01L 27/14618 257/678 |
| 2004/0095501 A1 | 5/2004 | Aizawa et al. |
| 2004/0212717 A1 | 10/2004 | Minamio et al. |
| 2006/0243884 A1 | 11/2006 | Onodera et al. |
| 2006/0251414 A1 | 11/2006 | Nishizawa |
| 2006/0273249 A1 * | 12/2006 | Webster ............ H01L 27/14618 250/239 |
| 2007/0030334 A1 | 2/2007 | Nishizawa |
| 2007/0045550 A1 | 3/2007 | Nakajo et al. |
| 2007/0047109 A1 | 3/2007 | Shibata et al. |
| 2007/0085180 A1 | 4/2007 | Kim et al. |
| 2007/0253708 A1 | 11/2007 | Watanabe et al. |
| 2007/0269205 A1 | 11/2007 | Lee et al. |
| 2007/0284714 A1 | 12/2007 | Sakakibara et al. |
| 2008/0105819 A1 * | 5/2008 | Wu .................... H01L 27/14618 250/216 |
| 2008/0251872 A1 * | 10/2008 | Kwon ............... H01L 27/14618 257/432 |
| 2009/0045476 A1 | 2/2009 | Peng et al. |
| 2009/0053850 A1 * | 2/2009 | Nishida ............. H01L 27/14618 438/64 |
| 2009/0109330 A1 | 4/2009 | Nakano et al. |
| 2009/0160998 A1 | 6/2009 | Fukamachi et al. |
| 2009/0244745 A1 | 10/2009 | Komuro |
| 2010/0025792 A1 | 2/2010 | Yamada et al. |
| 2011/0063496 A1 | 3/2011 | Chang |
| 2011/0096219 A1 * | 4/2011 | Lee .................... H01L 27/14618 348/308 |
| 2011/0262126 A1 | 10/2011 | Kawai et al. |
| 2012/0068292 A1 | 3/2012 | Ikeda et al. |
| 2012/0314309 A1 | 12/2012 | Tatebayashi et al. |
| 2013/0208359 A1 | 8/2013 | Matsuno et al. |
| 2014/0110565 A1 | 4/2014 | Teysseyre et al. |
| 2015/0077840 A1 | 3/2015 | Kim et al. |
| 2015/0243802 A1 * | 8/2015 | Fujimoto .......... H01L 31/02327 257/82 |

* cited by examiner

CAMERA MODULE

This application is a continuation of co-pending U.S. patent application Ser. No. 13/683,091, filed on Nov. 21, 2012, which claims priority under 35 U.S.C. §119(a) to Korean Patent Application Nos. 10-2011-0123090, filed on Nov. 23, 2011, 10-2011-0125610, filed on Nov. 29, 2011, and 10-2011-0125612, filed on Nov. 29, 2011. The contents of all of these applications are hereby incorporated by reference as fully set forth herein in their entirety.

BACKGROUND OF THE DISCLOSURE

Field of the Disclosure

The teachings in accordance with exemplary embodiments of the present disclosure generally relate generally to a camera module.

Discussion of the Related Art

This section provides background information related to the present disclosure which is not necessarily prior art.

Generally, an auto focusing adjustment of a camera module is realized by lens control using a VCM (Voice Coil Motor). A camera module formed with a VCM performs a reciprocating operation of a bobbin relative to an image sensor in response to an interaction between a coil wound on a periphery of the bobbin and a yoke to control a focus of an image incident on the camera module.

Meanwhile, unlike the eyes of a human, the image sensor can detect light of all wavelength bands, such that there is a need of interrupting light of IR (Infrared) wavelength band in order to recognize an image only in a visible light region. To this end, an IR interruption filter is interposed between the image sensor and the lens. However, a camera module includes therein many factors capable of generating foreign objects, and foreign objects may drop on an upper surface of the image sensor to disadvantageously generate a black spot or stain phenomenon, thereby causing defects in the image captured by the camera module, or causing the image appear as a black spot or stain.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a camera module improved in structure mounting a UV (Ultraviolet) cut filter on a base. Another aspect of the present disclosure provides a camera module having an image sensor reduced in generation of a black spot-oriented defect caused by foreign objects.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera module, the camera module comprising: a PCB (Printed Circuit Board) mounted with an image sensor; a base installed at an upper surface of the PCB and formed with a window at a position corresponding to that of the image sensor; an IRCF (Infrared Cut Filter) installed at an upper surface of the base; and an adhesive member fixing the IRCF to the base.

Preferably, but not necessarily, the adhesive agent may include an adhesive section adhering the IRCF to the base, and a foreign object collection section free from contact with the IRCF.

Preferably, but not necessarily, the adhesive agent may be attached to a surface of a periphery of the window opposite to the IRCF, and may be arranged to be spaced apart from the periphery of the window at predetermined distance, and having a predetermined width.

Preferably, but not necessarily, the IRCF may be formed to have an area greater than that of the window, and the adhesive agent may be attached to a surface of a periphery of the window opposite to the IRCF to have an area greater than a contact area between the IRCF and the base.

Preferably, but not necessarily, the adhesive agent may be adhesively fixed to a concave groove of the base so formed as to have a depth corresponding to a thickness of the adhesive agent.

Preferably, but not necessarily, the adhesive agent may be adhesively fixed to a concave groove of the base so formed as to have a depth deeper than a depth corresponding to a thickness of the adhesive agent.

Preferably, but not necessarily, the adhesive agent may be provided in any one of a double-sided tape and an epoxy.

Preferably, but not necessarily, the adhesive agent may be fixedly arranged on an upper surface of the base.

Preferably, but not necessarily, the adhesive agent may be adhesively fixed to a concave groove of the base so formed as to have a depth deeper than a depth corresponding to a thickness of the adhesive agent, and the concave groove may be connected to an upper surface of the base through a slope to guide foreign objects at the upper surface of the base to the adhesive agent.

Preferably, but not necessarily, the camera module may further comprise: a bobbin including a coil winding unit vertically and reciprocally movable on the upper surface of the base and provided at a periphery, and a plurality of rib members protrusively formed on a floor surface; and a yoke mounted with a magnet arranged at a position corresponding to that of a coil of the bobbin.

Preferably, but not necessarily, the yoke may be provided with a shield can of metal material having an EMI (Electromagnetic Interference) function to form an extreme outer shell of the camera module, and the yoke may further include a housing member formed in a resin material, and provided at an outer surface thereof with a shield can of metal material having the EMI function.

Preferably, but not necessarily, the outer surface of the yoke may form an extreme outer shell of the camera module, and a balance surface of the yoke integrally forms the housing member to allow being on a same surface as the outer surface of the yoke.

In another general aspect of the present disclosure, there is provided a camera module, the camera module comprising: one or more sheets of lenses receiving an optical image of an object; an image sensor converting the optical image of the object from a lens to an electrical signal, formed at an upper surface with a dam, and formed at an upper marginal area of the image sensor with a dust trap from the dam; and a substrate mounted with the image sensor.

Preferably, but not necessarily, the dam may be provided with a shape of a ring.

Preferably, but not necessarily, the dam may be formed at a periphery of an active region.

Preferably, but not necessarily, the dam may be formed at a position spaced apart from the active region.

Preferably, but not necessarily, the dust trap may be further formed to an upper surface of the substrate not mounted with the image sensor.

Preferably, but not necessarily, the dust trap may be provided in an epoxy or an adhesive agent.

Preferably, but not necessarily, the dust trap may be further formed at a lateral surface of the image sensor.

Preferably, but not necessarily, the dam may be a curable epoxy.

Preferably, but not necessarily, the dam may be formed at an upper surface of the image sensor using a separate dam member using an adhesive material.

Preferably, but not necessarily, the camera module may further comprise: a lens barrel embedded with the lens; an actuator moving the lens barrel; and a holder supporting the lens barrel and the actuator and attached to the substrate.

Preferably, but not necessarily, the actuator may include one of a VCM (Voice Coil Motor) actuator, an actuator driven by a piezoelectric force and a MEMS (Micro Electro Mechanical System) actuator driven by electrostatic capacity method.

Preferably, but not necessarily, the holder may be formed with a window passing an optical image incident on the lens, and an IR (Infrared Cut Filter) is interposed between the window and the image sensor.

Preferably, but not necessarily, the holder may be formed with a window passing an optical image incident on the lens, and an IRCF (Infrared Cut Filter) is interposed between the window and the lens.

The IRCF may be attached/fixed using an adhesive agent attached to the base, and a balance adhesive surface may be used for a dust trap for collecting foreign objects, whereby fine minute particles generated inside the camera module can be minimized in polluting the IRCF.

The present disclosure has an advantageous effect in that a dam is formed at an upper surface of an image sensor, and a dust trap is formed at an upper surface of the image sensor at a periphery of the dam to thereby trap more foreign objects dropping from the image sensor, and the image sensor is reduced in being generated with black spot defects caused by the foreign objects.

The present disclosure has a further advantageous effect in that a dam is formed at an upper surface of an image sensor, whereby the formed dust trap can prevent an active region of the image sensor from being polluted.

The present disclosure has a still further advantageous effect in that a dust trap can be formed at an upper surface of the image sensor at a periphery of the dam, at a lateral surface of the image sensor and at an upper surface of a substrate to form an increased area of dust trap about the image sensor, whereby most of the foreign objects moving at the upper surface of the image sensor can be trapped and the foreign objects are prevented from dropping to the active region.

Other exemplary aspects, advantages, and salient features of the disclosure will become more apparent to persons of ordinary skill in the art from the following detailed description, which, taken in conjunction with the annexed drawings, discloses exemplary embodiments of the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
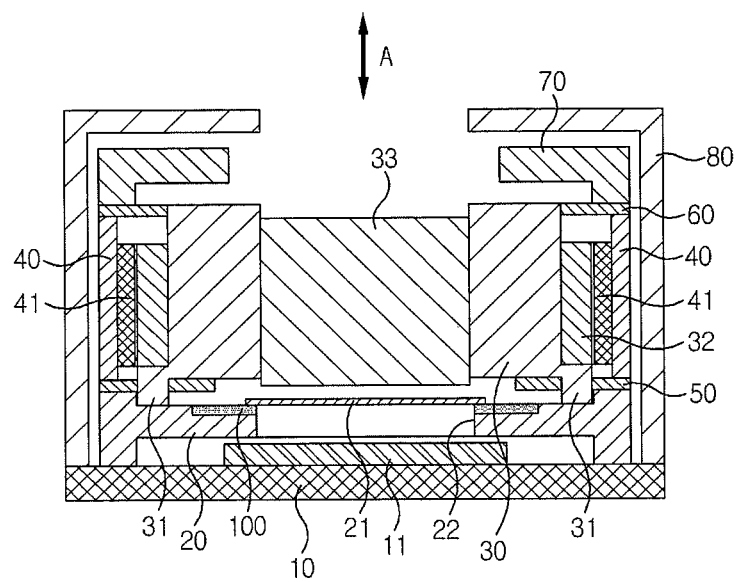
FIG. 1 is a cross-sectional view illustrating a schematic structure of a camera module according to a first exemplary embodiment of the present disclosure.
Figure 2:
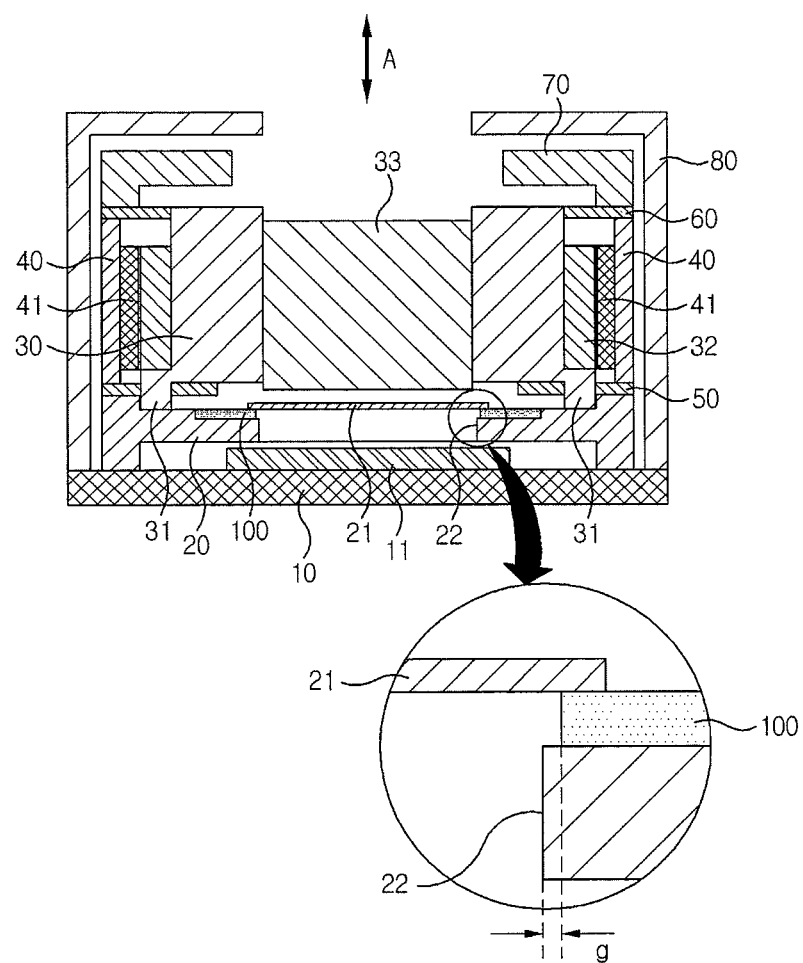
FIG. 2 is a cross-sectional view illustrating a schematic structure of a camera module according to a second exemplary embodiment of the present disclosure.
Figure 3:
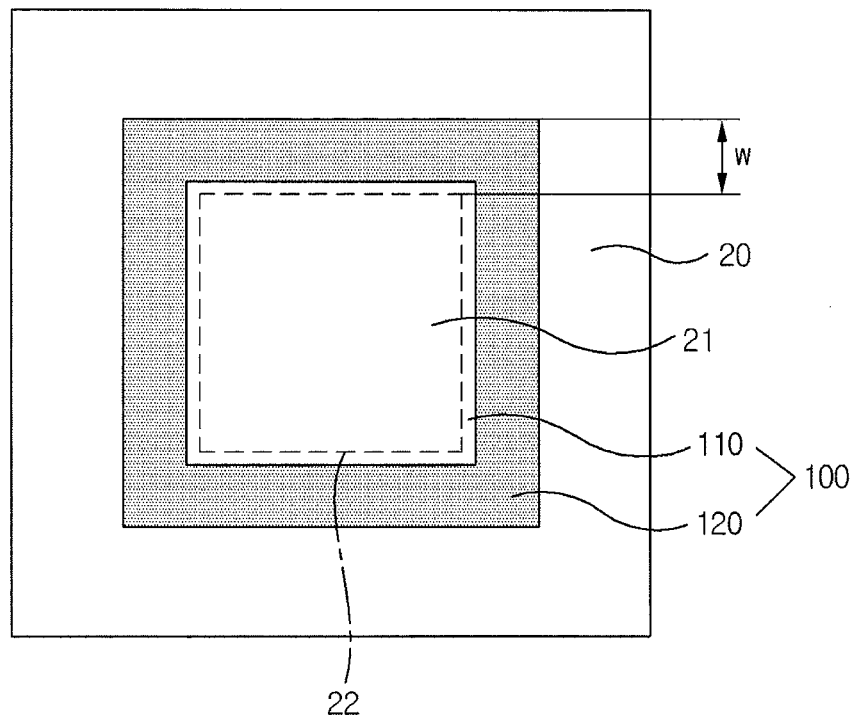
FIG. 3 is a plan view illustrating a base of FIG. 1.
Figure 4:
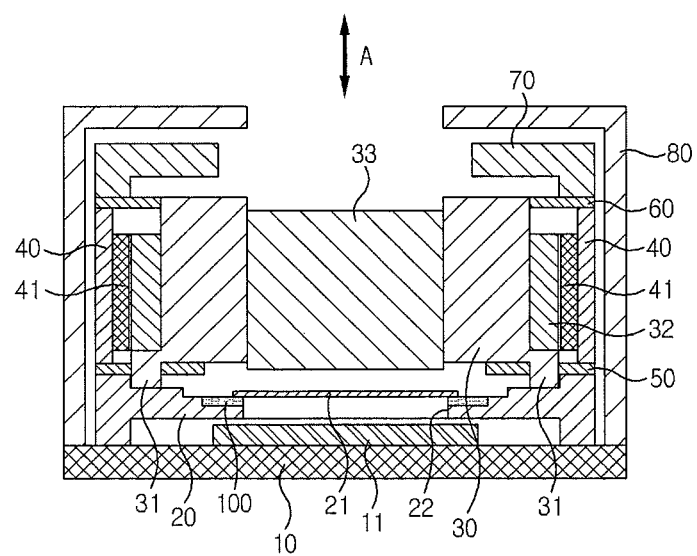
FIGS. 4 and 5 are cross-sectional views illustrating a schematic structure of a camera module according to a third exemplary embodiment of the present disclosure.
Figure 5:
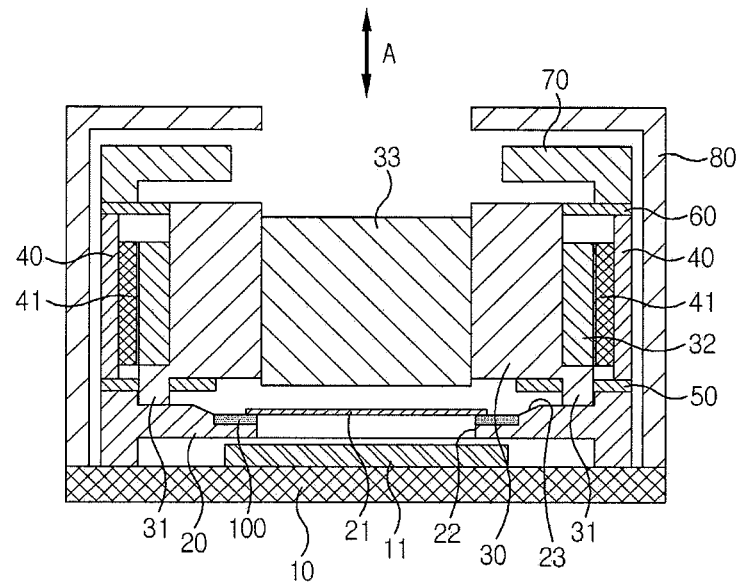

FIG. 1 is a cross-sectional view illustrating a schematic structure of a camera module according to a first exemplary embodiment of the present disclosure, FIG. 2 is a cross-sectional view illustrating a schematic structure of a camera module according to a second exemplary embodiment of the present disclosure, FIG. 3 is a plan view illustrating a base of FIG. 1, and FIGS. 4 and 5 are cross-sectional views illustrating a schematic structure of a camera module according to a third exemplary embodiment of the present disclosure.

Referring to FIGS. 1 to 4, the camera module according to an exemplary embodiment of the present disclosure includes a PCB (10), a base (20), a bobbin (30), a yoke (40), a bottom spring (50), an upper spring (60), a cover member (70) and a shield can (80).

The PCB (10) is mounted at an upper surface with an image sensor (11), and the image sensor (11) is installed at an upper surface with the base (20).

The base (20) is centrally formed at a position corresponding to a position of the image sensor (11) with a though hole passing a window (22), and an image can be transmitted to the image sensor (11) through the window (22). The window (22) is installed with an IRCF (21), details of which will be provided later.

The bobbin (30) is liftably formed at an upper surface of the base (20), and is protrusively formed at a floor surface with a plurality of rib members (31) to surface-contact the base (20) at an initial position.

The bobbin (30) is wound at a periphery thereof with a coil (32), and in a case a current flows in the coil (32), a magnetic field is formed at the bobbin (30), whereby a reciprocative movement is performed in response to interaction with a magnet (41) mounted on the yoke (40).

The yoke (40) is arranged at an upper surface of the base (20), and the yoke (40) is movably formed at an inner surface with the bobbin (30) mounted with the lens (32) to a vertical direction ('A' arrow direction) of FIG. 1. The yoke (40) is formed at the inner surface with a magnet (41) in opposition to the bobbin (40) wound with the coil (32).

The bottom spring (50) is interposed between the yoke (40) and the base (20), and is so configured as to support a floor surface of the bobbin (30), whereby the vertical movement of the bobbin (30) is elastically supported. The bottom spring (50) is connected with a start line and an end line of the coil (32) wound on the periphery of the bobbin (30), where the coil (32) is electrically connected to the PCB (10) through the bottom spring (50).

Although not illustrated in the drawings, a spacer may be interposed between the yoke (40) and the bottom spring (50). The spacer is installed to insulate the bottom spring (50) from the yoke (40), where it would be possible to the base (20) instead of the spacer by changing a shape of the base (20).

The cover member (70) is coupled to an upper surface of the yoke (40). The cover member (70) is centrally formed with an opening with a size corresponding to that of the lens (33) in order to allow an outside image to be transmitted to the image sensor (11) through the lens (33).

Meanwhile, the cover member (70) may be omitted, depending on circumstances, or only a lateral portion arranged at an upper surface of the cover member (70) may be provided, where a boss (not shown) protrusively formed at an upper surface of the cover member (70) is formed and the upper spring (60) is fixed using the boss.

The shield can (8) is configured to wrap an outer shell of the abovementioned constituent elements, where a lens hole equal to in size or greater than the through hole is formed at a position corresponding to the through hole to allow the outside image to be transmitted to the image sensor (11) through the through hole.

Meanwhile, although not illustrated in the drawings, it is possible to form a housing member to wrap the yoke (40) forming an outer shell of the camera module. In this case, the housing member is centrally arranged with a lens hole the size of the lens (33) to allow the outside image to be transmitted to the image sensor (11) through the lens (33) arranged at an inner surface of the bobbin (30).

Furthermore, the housing member is preferably provided with a metal material to perform an EMI function. However, the present disclosure is not limited thereto, and it is possible to form an extreme outer shell of the camera module with resin material, or other metal material.

Furthermore, the housing member and the yoke (40) may be integrally formed instead of using a separate housing member. That is, in order to reduce the size of the camera module, a housing member wrapping the yoke (40) is dispensed with, and an outer surface of the yoke (40) may be exposed while the housing member may be formed with only the balanced portion for integration to allow on the same surface as the outer surface of the yoke (40).

Referring to FIGS. 1 and 2, the IRCF (21) is fixed to the base (20) using an adhesive agent (100). The adhesive agent (100) may be a double-sided tape, or any adhesive means including an adhesive and epoxy.

If a separate curing process is to be added, an UV (Ultraviolet) epoxy or thermosetting epoxy that requires UV treatment or thermosetting process may be used.

The adhesive agent (100) is arranged at a periphery of the window (22) with a predetermined width (w) as shown in FIG. 3, where the width (w) may be formed greater than a contact area between the IRCF (21) and the base (2). Thus, as illustrated in FIG. 3, the adhesive agent (100) may be divided to an adhesive section (110) adhering the IRCF (21) to the base (20), and a foreign object collection section (120) not contacting the IRCF (21). At this time, an area of the adhesive section (110) is preferably formed larger than an area of the foreign object collection section (120).

The adhesive agent (100) is arranged at an upper surface of the base (20), and is preferably interposed between the IRCF (21) and the base (20). The adhesive agent (100) may be directly attached to the upper surface of the base (20), or a groove having a height corresponding to a thickness of the adhesive agent (100) may be formed on the upper surface of the base (20), to which the adhesive agent (100) may be attached as shown in FIGS. 1 and 2.

Referring to FIG. 2 again, the adhesive agent (100) may be arranged in a state of being spaced apart from the periphery of the window (22) at a predetermined distance (g). Ideally, the adhesive agent (100) is closely arranged at the periphery of the window (22). However, in consideration of the need for an arrangement error that occurs in the arranging process of the adhesive agent (100), the adhesive agent (100) is arranged with an allowance of a predetermined distance (g) from the periphery of the window (22).

According to the second exemplary embodiment of the present disclosure as illustrated in FIG. 4, a groove having a depth greater than a thickness of the adhesive agent (100) is formed at the upper surface of the base (20), and the adhesive agent (100) may be arranged inside the groove. In this case, a staircase-like portion may be provided at the groove accommodated by the upper surface of the base (20) and the adhesive agent (100).

Alternatively, as shown in FIG. 5, the staircase portion is provided with a slope (23), and pollutants such as fine minute particles inside the camera module may be induced to the adhesive agent (100) side through the slope (23).

According to the third exemplary embodiment of the present disclosure, a dust trap resin (100) may be coated on a surface facing the image sensor (11) of the base (20) mounted with the IRCF (21), and in order to facilitate the coating of the dust trap resin (100), a dust trap resin cut rib (23) may be formed at an ambience of the window (22).

Furthermore, the IRCF (21) may be formed on an opposite surface of a surface facing the image sensor (11) of the base (20). That is, referring to FIGS. 1 to 3, the IRCF (21) is arranged at the window (22) penetratively formed at the base (20), where an arranged portion of the IRCF (21) at the window (22) is protrusively formed with the dust trap resin cut rib (23) at a predetermined height towards the image sensor (11).

At this time, a surface facing the PCB (10) is coated with the dust trap resin (100) at a predetermined thickness, where the dust trap resin (100) may be coated on an inner surface of the dust trap resin cut rib (23) and a lateral wall surface of the PCB (10) as shown in FIG. 2. Furthermore, it may be possible to coat the dust trap resin (100) on any one of the an inner surface of the dust trap resin cut rib (23) and the lateral wall surface of the PCB (10).

At this time, the dust trap resin cut rib (23) is preferably formed with a chamfer (24), where the chamfer (24) is to avoid interference with a wire-bonded portion, in a case the base (20) is mounted on the PCB (10). In addition, the dust trap resin cut rib (23) is preferably formed at an upper surface of a non-image area of the image sensor (11) to avoid a contact with the image sensor (11). The dust trap resin cut rib (23) may be arranged at an upper surface of a position spaced apart from an image area of the image sensor at a predetermined distance.

Figure 6:
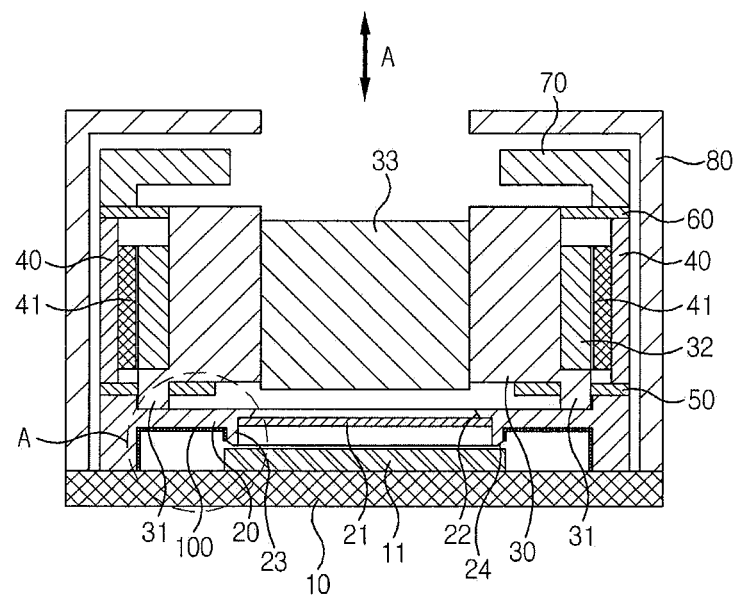
FIG. 6 is a cross-sectional view illustrating a schematic structure of a camera module according to a fourth exemplary embodiment of the present disclosure.
Figure 7:
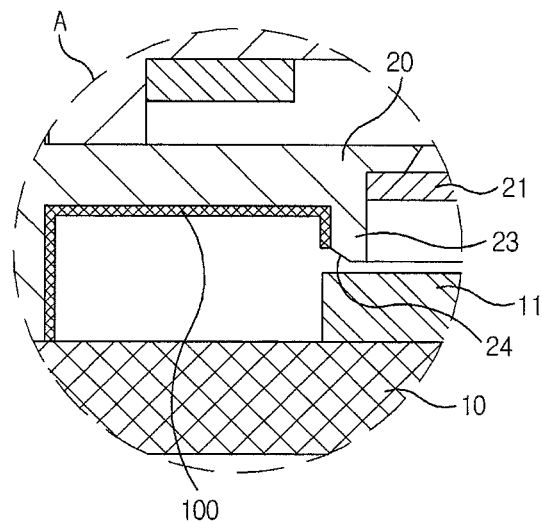
FIG. 7 is an enlarged view of 'A' of FIG. 6.

FIG. 6 is a cross-sectional view illustrating a schematic structure of a camera module according to a fourth exemplary embodiment of the present disclosure and FIG. 7 is an enlarged view of 'A' of FIG. 6.

Referring to FIGS. 6 and 7, the camera module according to the exemplary embodiment of the present disclosure includes a PCB (10), a base (20), a bobbin (30), a yoke (40), a bottom spring (50), an upper spring (60), a cover member (70) and a shield can (80), the configuration of which is same as that of the previous exemplary embodiment.

However, according to the fourth exemplary embodiment of the present disclosure, the dust trap resin (100) may be coated on a surface facing the image sensor (11) of the base (20) mounted with the IRCF (21), and in order to facilitate the coating of the dust trap resin (100), a dust trap resin cut rib (23) may be formed at an ambience of the window (22). Furthermore, the IRCF (21) may be formed at the opposite surface of a surface facing the image sensor (11) of the base (20).

Figure 8:
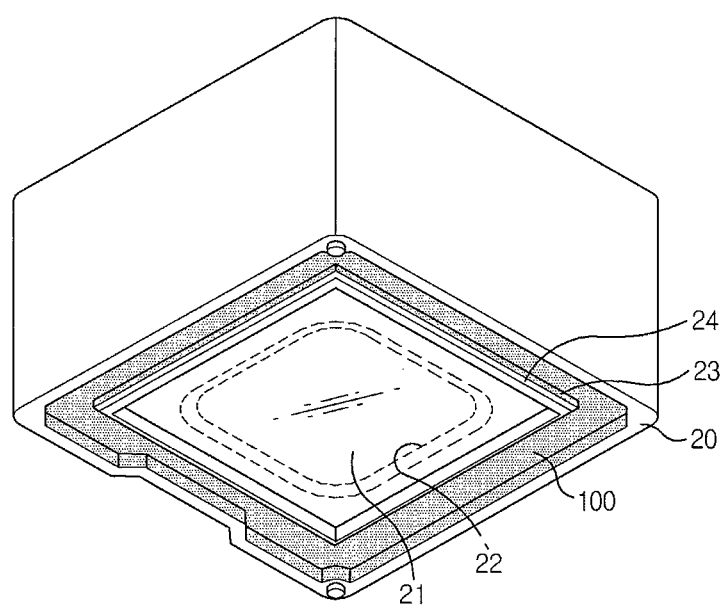
FIG. 8 is a schematic bottom perspective view illustrating a base coated with a dust trap of FIG. 6.

That is, referring to FIGS. 6, 7 and 8, the IRCF (21) is mounted at the window (22) penetratively formed at the base (20), where the mounted area of the IRCF (21) at the window (22) is protrusively formed with the dust trap resin cut rib (23) at a predetermined height towards the image sensor (11). At this time, a surface facing the PCB (10) of the base (20) is coated with the dust trap resin (100) at a predetermined height, and at this time, as illustrated in FIG. 7, the dust trap resin (100) may be coated onto an inner surface of the dust trap resin cut rib (23) and the lateral wall surface of the PCB (10).

Furthermore, it may be possible to coat the dust trap resin (100) on any one of the an inner surface of the dust trap resin cut rib (23) and the lateral wall surface of the PCB (10).

At this time, the dust trap resin cut rib (23) is preferably formed with a chamfer (24), where the chamfer (24) is to avoid interference with a wire-bonded portion, in a case the base (20) is mounted on the PCB (10). In addition, the dust trap resin cut rib (23) is preferably formed at an upper surface of a non-image area of the image sensor (11) to avoid a contact with the image sensor (11). The dust trap resin cut rib (23) may be arranged at an upper surface of a position spaced apart from an image area of the image sensor at a predetermined distance.

According to the configuration thus described, the dust trap resin cut rib (23) of a predetermined height is formed at a periphery of the IRCF (21) of a direction facing the image sensor (11) of the base (20) contacting a floor surface of the bobbin (30) of auto focusing unit formed with a VCM, whereby the dust trap resin (100) is prevented from overflowing to pollute the IRCF (21) in a case the dust trap resin (100) is coated.

Furthermore, the coating of the dust trap resin (100) on the dust trap resin cut rib (23) and the floor surface and lateral wall surface of the base (20) can reduce the black spot defect of the camera module that may be generated by the movable foreign objects being transmitted to the image sensor (11) side during the mounting process of the base (20) to the PCB or reliability test.

According to the configuration thus described in FIGS. 1 and 2 again, a part of the adhesive agent (100) adheres the IRCF (21) to the base, and a balance of the adhesive agent (100) not contacting the IRCF (21) performs the dust trap function to collect fine dust or particles inside the camera module.

In addition, free from a separate adhesive coating and a curing process, a simple operation of placing the IRCF (21) on a precise position where the adhesive agent (100) is attached to the base (20) can finish the fixation of the IRCF (21) to simplify a camera module manufacturing process and to reduce the manufacturing cost.

Furthermore, because the dust trap resin cut rib (23) of a predetermined height is formed at a periphery of the IRCF (21) of a direction facing the image sensor (11) of the base (20) contacting a floor surface of the bobbin (30) of auto focusing unit formed with a VCM, the dust trap resin (100) is prevented from overflowing to pollute the IRCF (21), in a case the dust trap resin (100) is coated.

Still furthermore, the coating of the dust trap resin (100) on the dust trap resin cut rib (23) and the floor surface and lateral wall surface of the base (20) can reduce the black spot defect of the camera module that may be generated by the movable foreign objects being transmitted to the image sensor (11) side during the mounting process of the base (20) to the PCB or reliability test.

Figure 9:
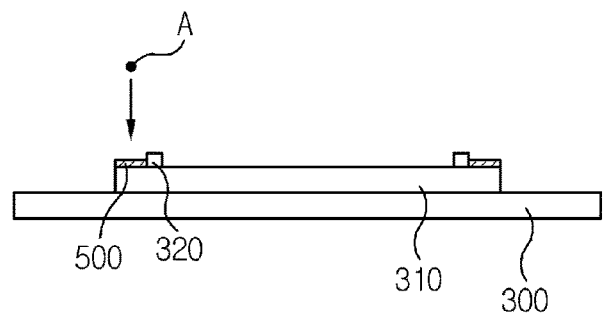
FIG. 9 is a cross-sectional view illustrating a schematic structure of a camera module according to a fifth exemplary embodiment of the present disclosure.
Figure 10:
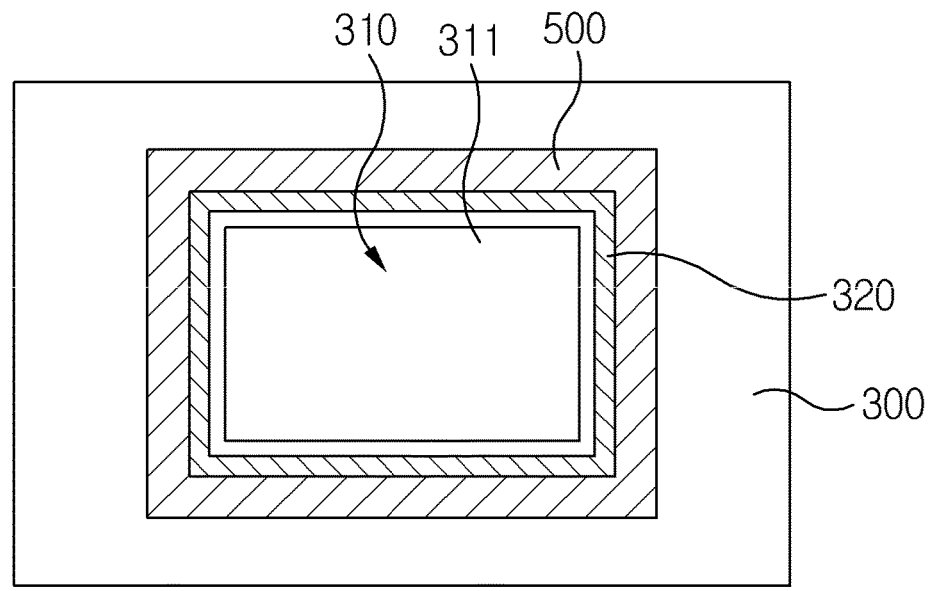
FIG. 10 is a plan view of a substrate of FIG. 9.

FIG. 9 is a cross-sectional view illustrating a schematic structure of a camera module according to a fifth exemplary embodiment of the present disclosure and FIG. 10 is a plan view of a substrate of FIG. 9.

A substrate (300) of a camera module according to the fifth exemplary embodiment of the present disclosure is mounted with an image sensor (310), a dam (320) is formed at an upper surface of the image sensor (310), and a dust trap (500) is formed from the dam (320) to a marginal area at the upper surface of the image sensor (310).

The dust trap (500) is an adhesive material or an adhesive adhering foreign object (A) flowing or moving at the upper surface of the image sensor (310). The image sensor (310) serves to convert an optical image of an object through a lens to an electrical signal.

Referring to FIG. 10, the dust trap (500) cannot pollute an active region (a region capturing the optical image of the object) of the image sensor (310) because of the dam (320). That is, the dust trap (500) has a low viscosity and can flow into the active region (311) of the image sensor (310), where the dam (320) can prevent the dust trap (500) from flowing into the active region (311) of the image sensor (310).

Thus, the present disclosure is advantageously configured in such a manner that the foreign object (A) is adhered by the dust trap formed at the upper surface of the image sensor (310) to significantly reduce the drop of the foreign object (A) to the image sensor (310), whereby generation of a black spot defect on the image sensor (310) caused by the foreign object (A) can be reduced.

Furthermore, as shown in FIG. 10, the dam (320) may be formed in a shape of a ring, where the shape of a ring includes a circular ring, a square ring and other shapes of a ring. The dam (320) may be formed at a periphery of an active region (311) of the image sensor (310). The dam (320) may be also formed at a position spaced apart from the periphery of the active region (311) of the image sensor (310) at a predetermined distance.

In this case, the formation of the dam (320) can prevent a dam material from directly flowing into the active region (311) of the image sensor (310). At this time, the dam (320) may be formed with a curable epoxy having a high viscosity. This is to prevent the dam from flowing to the maximum before curing at the time of forming the dam. The dam (320) may be formed with a low temperature curable epoxy, a thermosetting epoxy and a UV epoxy. Furthermore, the dam (320) may be formed by fixing a separate dam member to the image sensor (310) using an adhesive material.

Figure 11:
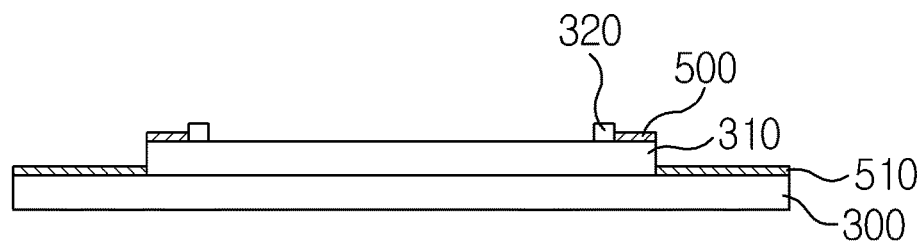
FIG. 11 is a cross-sectional view illustrating a schematic structure of a camera module according to a sixth exemplary embodiment of the present disclosure.
Figure 12:
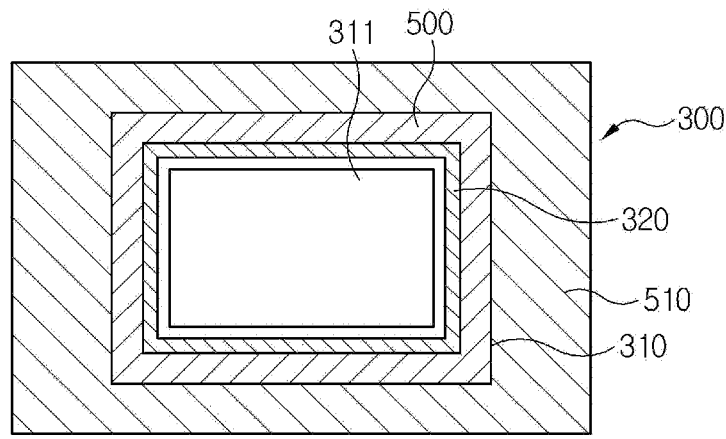
FIG. 12 is a plan view of a substrate of FIG. 11.

FIG. 11 is a cross-sectional view illustrating a schematic structure of a camera module according to a sixth exemplary embodiment of the present disclosure and FIG. 12 is a plan view of a substrate of FIG. 11.

A substrate (300) of a camera module according to the sixth exemplary embodiment of the present disclosure is such that a dam (320) is formed at an upper surface of the image sensor (310), a dust trap (500) is formed from the dam (320) to a marginal area at the upper surface of the image sensor (310), and a dust trap (510) is formed at an upper surface of the substrate (300) not mounted with the image sensor (310), as shown in FIG. 11.

Thus, as illustrated in FIG. 12, the camera module according to the sixth exemplary embodiment of the present disclosure is such that the dust traps (500, 510) are formed at the upper surface of the image sensor (310) positioned at a periphery of the dam (320) and the upper surface of the image sensor (310), whereby a foreign object can be further trapped over the fifth exemplary embodiment of the present disclosure to reduce defects caused by the foreign object.

Figure 13:
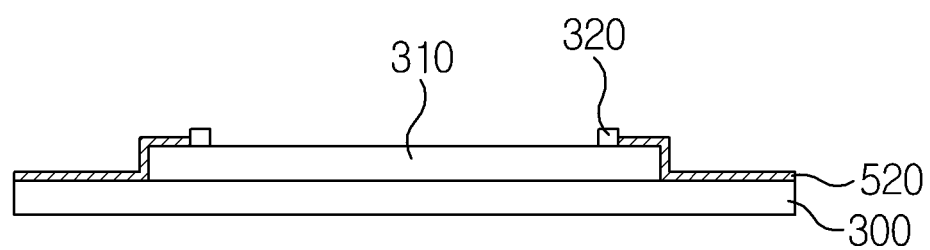
FIG. 13 is a cross-sectional view illustrating a schematic structure of a camera module according to a seventh exemplary embodiment of the present disclosure.

FIG. 13 is a cross-sectional view illustrating a schematic structure of a camera module according to a seventh exemplary embodiment of the present disclosure.

A substrate (300) of a camera module according to the seventh exemplary embodiment of the present disclosure is such that a dam (320) is formed at an upper surface of the image sensor (310), a dust trap (520) is formed from the dam (320) to a marginal area at the upper surface of the image sensor (310), at an upper surface of the substrate (300) not mounted with the image sensor (310) and at a lateral surface of the image sensor (310).

That is, the camera module according to the seventh exemplary embodiment of the present disclosure is such that the dust trap (520) is formed at the upper surface and the lateral surface of the image sensor (310) positioned at a periphery of the dam (320), the upper surface of the image sensor (310), whereby foreign objects formed on most of the exposed surfaces at the periphery of the dam (320) can be trapped by the dust trap (520), such that defects caused by the foreign objects can be further reduced over the fifth and sixth exemplary embodiments of the present disclosure.

The dust traps formed on the substrates of the camera module according to the fifth, the sixth and seventh exemplary embodiments of the present disclosure may be applied with dust trap epoxy.

Thus, the present disclosure can form the dust trap (520) at the upper surface of the image sensor (310) positioned at a periphery of the dam (320), and the upper surface of the substrate (300), to increase formation of an area at an ambience of the image sensor (310) and to trap most of the foreign objects moving and flowing on the upper surface of the image sensor (310), whereby the drop of the foreign object to the active region (311) of the image sensor (310) can be prevented to reduce a defective image sensor (310).

Figure 14:
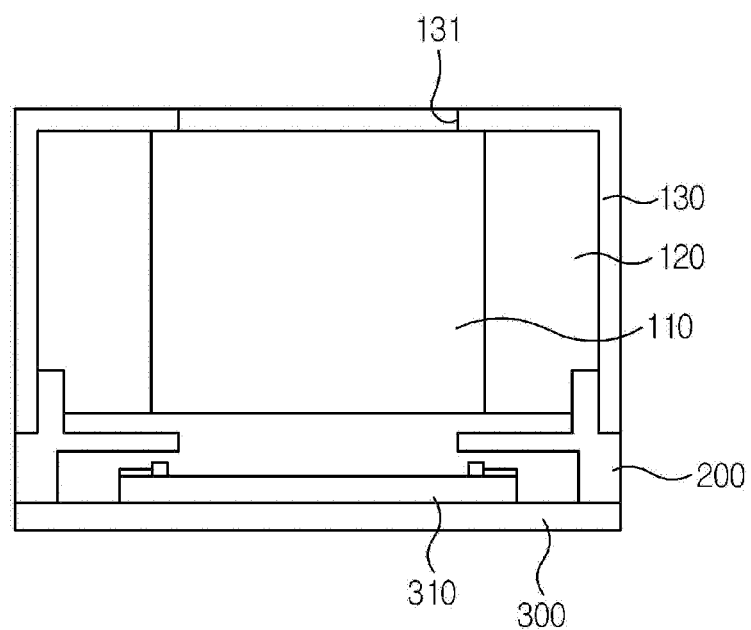
FIG. 14 is a cross-sectional view illustrating a schematic structure of a camera module according to an exemplary embodiment of the present disclosure.
Figure 15:
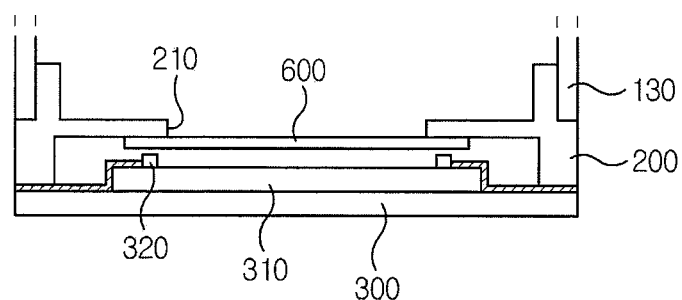
FIG. 15 is a partial cross-sectional view illustrating a schematic structure of a camera module according to an exemplary embodiment of the present disclosure.

FIG. 14 is a cross-sectional view illustrating a schematic structure of a camera module according to an exemplary embodiment of the present disclosure, and FIG. 15 is a partial cross-sectional view illustrating a schematic structure of a camera module according to an exemplary embodiment of the present disclosure.

Referring to FIG. 14, the camera module according to an exemplary embodiment of the present disclosure may include a lens barrel (110) including one or more sheets of lenses receiving an optical image of an object, an actuator (120) moving the lens barrel (110) and a holder (200) supporting the lens barrel (110) and the actuator (120), and attached to a substrate (300).

The actuator (120) moves the lens barrel along a direction to an optical axis for auto focusing. The actuator (120) may include one of a VCM (Voice Coil Motor) actuator, an actuator driven by a piezoelectric force and a MEMS (Micro Electro Mechanical System) actuator driven by electrostatic capacity method, where the VCM actuator may include a bobbin, a coil, a magnet and a yoke.

In addition, the camera module according to an exemplary embodiment of the present disclosure may include a shake correction actuator (not shown in FIG. 14) capable of correcting shakes of an optical image of an object. The shake correction actuator may be configured to correct shakes of an optical image of an object incident on the lens by moving a separate lens optically aligned with a lens embedded in the lens barrel to 2-axes of X-axis and Y-axis.

Furthermore, as illustrated in FIG. 15, the holder (200) may be formed with a window (210) passing an optical image incident on the lens. An IRCF (600) may be interposed between the window (210) and an image sensor (310). That is, the optical image having passed the window (210) is filtered of the IR by the IRCF (600) and incident on the image sensor (310), where the IRCF (600) may be attached to the holder (200). Furthermore, the IRCF (600) may be positioned between the lens and the window (210).

The above-mentioned camera module according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A camera module, the camera module comprising:
   at least one lens;
   a substrate disposed under the lens;
   an image sensor disposed on an upper surface of the substrate;
   a dam disposed on an upper surface of the image sensor; and
   a dust trap disposed on the upper surface of the image sensor outside the dam.

2. The camera module of claim 1, wherein the image sensor includes an active region converting an optical image of an object through the lens to an electrical signal, and wherein the dam is disposed outside the active region.

3. The camera module of claim 2, wherein the dam is spaced from a periphery of the active region.

4. The camera module of claim 1, wherein the dam is upwardly protruded from the upper surface of the image sensor.

5. The camera module of claim 1, wherein the dam takes a shape of a closed loop rectangle.

6. The camera module of claim 1, wherein the dam is formed on the upper surface of the image sensor using any one of a curable epoxy and a separate dam member.

7. The camera module of claim 1, wherein the dust trap is formed on the upper surface of the substrate not mounted with the image sensor.

8. The camera module of claim 1, wherein the dust trap is formed at a lateral surface of the image sensor.

9. The camera module of claim 1, wherein the dust trap is provided in any one of epoxy and an adhesive agent.

10. The camera module of claim 1, further comprising:
    a base disposed at an upper surface of the PCB and formed with a window at a position corresponding to that of the image sensor;
    a yoke disposed at an upper surface of the base; and
    a bobbin disposed at the upper surface of the base and mounted with the lens, the bobbin moving in response to interaction with a magnet mounted on the yoke.

* * * * *